June 9, 1925.  R. N. KOENIGSBERGER  1,540,888
DISAPPEARING ANTISKID LUG
Filed March 13, 1924  2 Sheets-Sheet 1
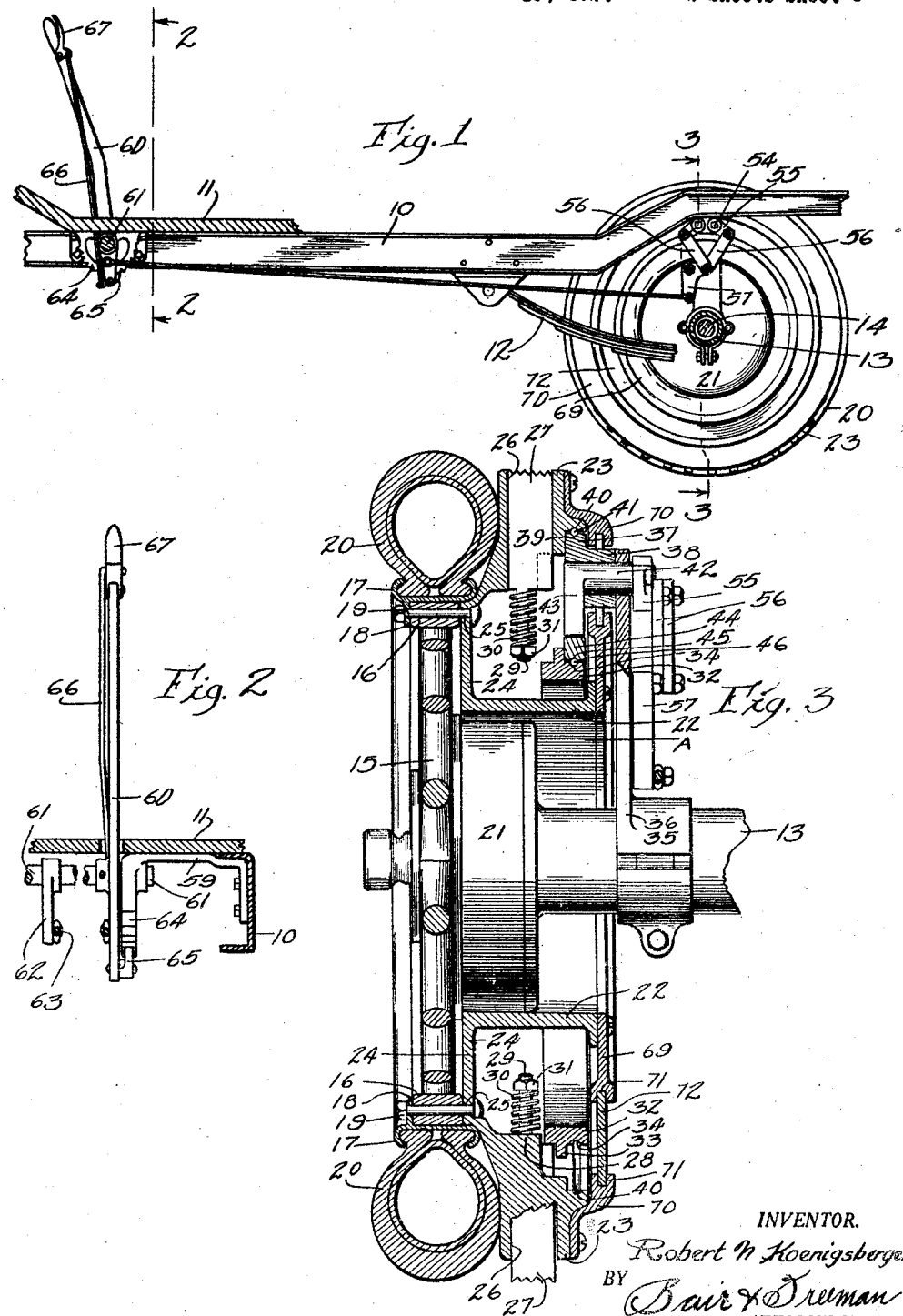

June 9, 1925.
R. N. KOENIGSBERGER
1,540,888
DISAPPEARING ANTISKID LUG
Filed March 13, 1924    2 Sheets-Sheet 2
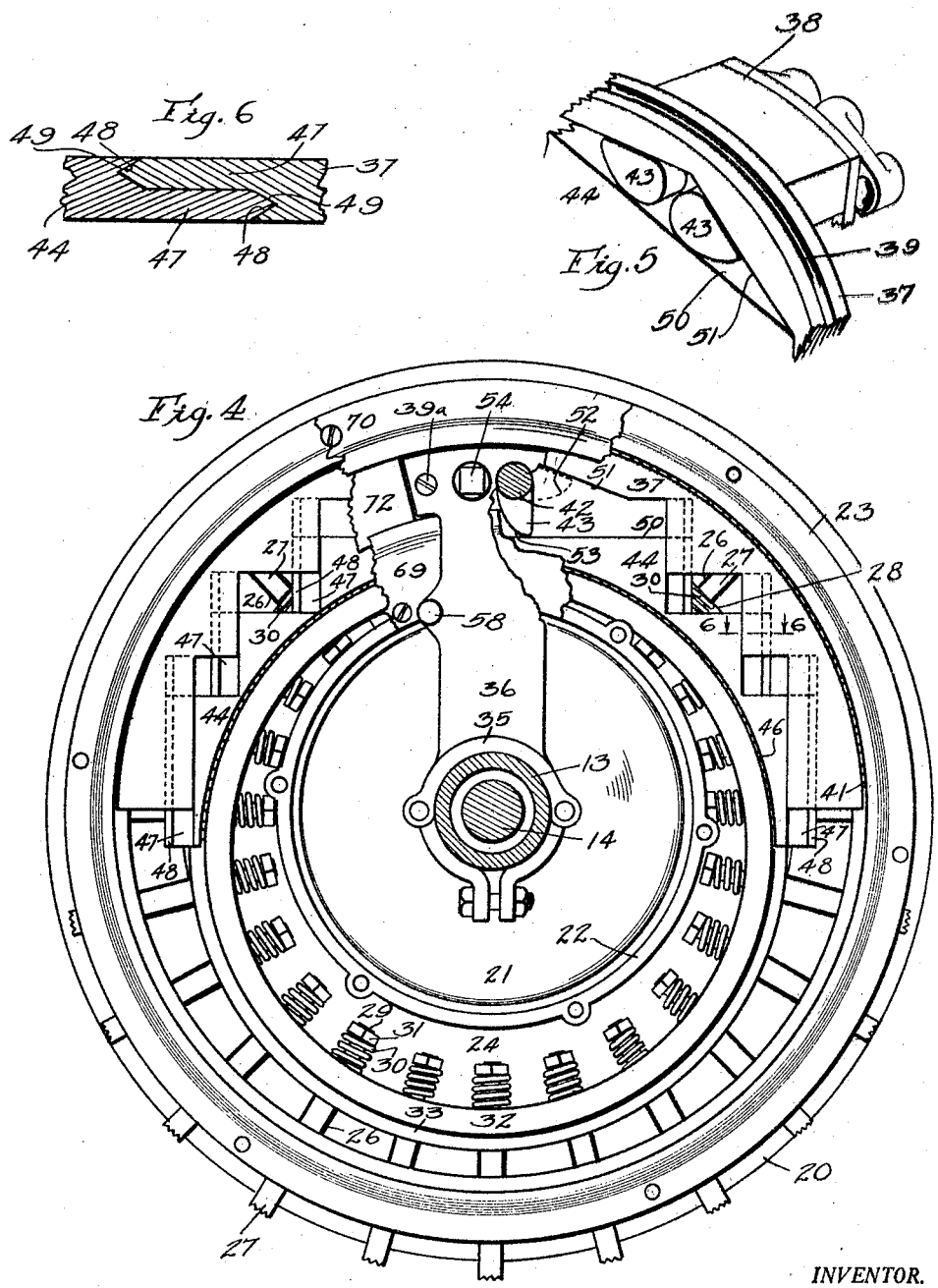
INVENTOR.
Robert N. Koenigsberger
BY Bair & Freeman
ATTORNEYS.

Patented June 9, 1925.

1,540,888

UNITED STATES PATENT OFFICE.

ROBERT N. KOENIGSBERGER, OF SIOUX CITY, IOWA.

DISAPPEARING ANTISKID LUG.

Application filed March 13, 1924. Serial No. 698,907.

*To all whom it may concern:*

Be it known that I, ROBERT N. KOENIGSBERGER, a citizen of the United States, and a resident of Sioux City, in the county of Woodbury and State of Iowa, have invented certain new and useful Improvements in Disappearing Antiskid Lugs, of which the following is a specification.

An object of my invention is to provide an attachment for the rear wheels of an automotive vehicle for preventing the skidding of the vehicle which is simple, durable and inexpensive in construction.

A further object is to provide such an attachment wherein extensible lugs are contained within a casing fixed to the rear wheels of the vehicle and may be extended so as to engage the pavement upon which the vehicle is traveling, while the vehicle is in motion.

More particularly, in this connection, it is my purpose to provide means for controlling the extending of the lugs, while the vehicle is in motion, from the driver's seat.

A further object is to provide such an attachment including a drum of slightly smaller diameter than the outer diameter of a pneumatic tire on the wheel, which may be used as an auxiliary wheel when the tire is deflated and which is of such diameter as to prevent the contact of the rear wheel with the pavement.

A still further object is the adaptation of such a device for use as an automobile jack for raising the rear wheels of the vehicle from the ground.

Specifically, one form of my invention may be embodied in a hollow drum fixed to the rear wheel, on the inside thereof, which has extensible lugs slidably mounted within it, and a floating ring adapted to engage the lugs for extending them, a stationary arch adapted to support the drum by sliding contact with the interior of the periphery thereof, a downwardly extensible arch slidably mounted on the stationary arch, means carried by the stationary arch for extending the sliding arch downwardly, the sliding arch contacting with the floating ring for extending the lugs, and means operable from the driver's seat to operate the means for extending the sliding arch.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a sectional view through a portion of the floor and rear axle housing of an automotive vehicle, a portion of the floor adjacent the driver's seat being shown and a portion of the frame and one of the rear wheels with my invention attached also being illustrated.

Fig. 2 is a sectional view of the operating lever, taken on the line 2—2 of Fig. 1.

Fig. 3 is a sectional view of a wheel with my invention attached thereto, taken on the line 3—3 of Fig. 1.

Fig. 4 is a side elevation of my invention attached to a wheel, parts of the cover members being removed to illustrate the interior thereof, and the axle housing of the vehicle being shown in section.

Fig. 5 is a perspective view illustrating the means for extending the sliding arch.

Fig. 6 is a detailed sectional view taken on the line 6—6 of Fig. 4.

One of the biggest troubles encountered by the motorist in the driving of a car is the occasional skidding of the tires on a wet or icy pavement. Skidding may be caused by attempting to turn a corner too rapidly; it may be caused by attempting to stop too rapidly, or by merely applying the brakes on a steep hill. In many instances automobiles in going down a hill on a smooth asphalt pavement, slightly coated with ice or slushy, have started skidding by the mere application of enough pressure to the brakes to keep the speed of the car under control. In such a case, the driver of the car either has to release his brakes and allow the car to coast at a dangerous speed down the hill with the possibility of an accident at the next crossing, or he must allow his car to skid and probably turn entirely around in the street before coming to a stop against the curbing or some other obstruction.

In many cases the driver of a car will wish to stop suddenly in order to avoid an accident. If the pavement is slippery he is very likely to skid in so doing and the chances of an accident through skidding will then be about as great as they were before he applied the brakes.

It is well known that when the momentum of the car overcomes the traction between the tires and the pavement and the car starts to skid it has a tendency to continue skidding and that it is very difficult to bring the car again under control after it has once begun to skid. It is also well understood that when the car does skid, it invariably will swing sideways so as to turn around, the resistance to skidding apparently being less when the side of the tire is foremost than when the tire is moving in the line of its plane.

My device is designed to stop skidding after it has once begun and to bring the car immediately within the control of the driver. In order to accomplish this it is necessary to provide anti-skidding mechanism which may be brought into operative position by controlling mechanism operated from the driver's seat.

In Fig. 1 I have used the reference numeral, 10, to indicate generally the frame of a car on which is mounted the ordinary floor boards, 11, and to which is attached through the resilient medium of the springs, 12, the rear axle housing, 13, which contains the rear axle, 14. On the axle, 14, is mounted the rear wheel, 15, having a felloe, 16, a rim, 17, the rear lugs, 18, the rim bolts, 19, and the pneumatic tire, 20. On the wheel is the brake drum, 21.

My invention comprises a casing, A, which has the inner sleeve, 22, the outer periphery, 23 (see Fig. 4) and the connecting disk, 24, all formed in one casting. The connecting disk, 24, is spaced so as to fit against the felloe, 16, and to extend out and around the tire, 20, and for the purpose of attaching it to the wheel, has the openings, 25, through which the rim bolts, 19, may be extended.

It will be noted in this connection that the rim bolts are extended through from the inside of the wheel to the outside, and that in order to remove the rim it is only necessary to remove the burr, the bolt remaining in the felloe, and the member, A, thus being retained on the wheel without being disturbed.

Slidably mounted in the slots, 26, in the periphery of the drum, A, are the traction lugs, 27. The slots, 26, are extended inwardly between two shoulders, 28, forming part of the casting, A.

On the inner ends of the lugs are the studs, 29, receiving springs, 30, which are held in place by nuts, 31, threaded onto the studs, 29. The outer end of each spring, 30, rests against the shoulders, 28.

I provide a floating ring, 32, adapted to engage the inner end of the lugs, 27, and having a flange, 33, which engages the side edges of the lugs. On the other side of the flange, 33, is a ball race, 34.

In order to force the ring against the lugs and extend the lugs outwardly against the action of the springs, 30, I provide the following mechanism. Fixed to the rear axle housing, 13, by means of the sleeve, 35, encircling the housing, is a bracket, 36. A stationary arch member, 37, is provided which is supported from the bracket, 36. The arch, 37, has a boss, 38, extending outwardly, and the bracket, 36, is bolted to the boss by means of screw bolts, 39ᵃ.

The arch, 37, is substantially semi-circular in form and has a smooth semi-circular periphery in which is the ball race, 39. In the interior of the periphery, 23, of the casing, A, is a ball race, 40. Balls, 41, are received between the ball races, 39 and 40, and may be retained by suitable retainers (not shown) in the arch, 37, if necessary.

Extended through the boss, 38, are the stub shafts, 42, formed integral with the cams, 43.

The inner edge of the arch is formed in a series of steps in order to obtain a sliding connection with the extensible arch, which will later be described. It may be stated briefly in this connection that it is necessary to provide a sliding connection between the stationary and sliding arches which will allow the sliding arch to slide vertically, and in order to obtain this sliding connection between two arches which must be semi-circular in their general shape and, which when fitted together must occupy a limited amount of space, it is necessary to provide the slides in stepped relation to each other.

The inner arch, 44, has its inner edge semi-circular and has the ball race, 45, designed to coact with the ball race, 34, through the medium of the balls, 46. It will thus be seen that a sliding connection is obtained between the arch and the ring, 32, in order that the ring may rotate with the wheel while the arch remains stationary.

Each of the arches, 37 and 44, have the flanges, 47, formed on the perpendicular edges of the stepped portions thereof, the flanges, 47, each being one-half the thickness of the arches and fitting together so that the arches are in the same plane. (See Fig. 6). The outer edges of the flanges, 47, are beveled as at 48 and are received in the beveled grooves, 49, in the respective arches. It will thus be seen that the arches are slidably connected in such a manner as to prevent lateral movement in either direction and so as to permit vertical sliding motion. The upper portion of the arch, 44, is flattened, as at 50, the underneath portion at the top of the arch, 37, being cut away, as at 51, to provide room for the cams, 43, in their normal position, which is shown at 52 in dotted lines in Fig. 4. (See also Fig. 5).

From the foregoing description it will be seen that when the cams, 43, are rotated downwardly to the position shown in full lines in Fig. 4, the lower arch, 44, will be forced downwardly with relation to the stationary arch and will carry with it the ring, 32, while allowing the ring to rotate. The ball bearing connection between the two eliminates friction and facilitates such relative rotation. At the same time the ball bearing connection between the upper arch and the casing, A, allows the casing to rotate, without friction, around the arch.

When the ring is forced downwardly it contacts with the upper ends of the lugs as they are rotated into position beneath the ring by the rotation of the casing, A. The lugs will be extended against the action of the springs, 30, and as the casing continues to rotate they will be drawn back into the casing when they near the top thereof. The same will happen when the ring is returned to its normal position by allowing the cams, 43, to rotate back to their horizontal position.

It may be stated here that the cams are designed to give the maximum amount of pressure at the time when the lugs will begin to contact with the pavement, and they are curved, as at 53, for this purpose.

In order to operate the cams the following mechanism is provided. The outer ends of the stub shafts, 42, are squared, as at 54, to receive the lever arms, 55, which are connected by links, 56, to a bell crank lever, 57, journaled on the stud, 58, on the bracket, 36. The bell crank lever, 57, is designed to double the leverage transmitted to it. A bracket, 59, underneath the floor adjacent the driver's seat may be provided for supporting a lever, 60, which is pinned to a shaft, 61, journaled in the bracket, 59, and extending across from side to side of the car. The other end of the shaft, 61, may be suitably journaled in a bearing (not shown) and carries the lever, 62 which is fixed thereto. To the lever, 62, and the lower end of the lever, 60, are pivoted the links, 63, which connect the levers to the bell crank lever, 57. A ratchet, 64, forming part of the bracket, 59, is engaged by the pawl, 65, on the end of the lever, 60, for maintaining the lever in any desired position against the pull on the rod, 63, occasioned by the weight of the car acting against the lugs, 27. The pawl, 65, may be controlled by a rod, 66, and a hand lever, 67.

Before proceeding further with the detailed description of my invention I will explain in detail its operation.

As the wheel rotates the drum, A, which is fixed to it, will rotate along with it and the ring, 32, will ordinarily also rotate. The arches, 37 and 44, will remain stationary, being held so by the bracket, 36. When it is desired to operate the device, the lever, 60, is pulled rearwardly and the bell crank lever, 57, will draw the links, 56, downwardly, thus causing the cams, 43, to rotate downwardly and to force the lower arch, 44, against the ring, 32, for extending the lugs, 27, as herebefore described. The lugs, 27, as they are rotated to the bottom of the wheel, will contact with the pavement and thus effectively prevent skidding. For this purpose they may be toothed, as at 68. During the normal use of the car the lugs will be retained within the drum and the drum will rotate around the arches, 37 and 44, the ring, 32, remaining concentric with the drum. It will be understood that the drum is of slightly less diameter than the tire, 12, so that ordinarily it will not contact with the pavement. If the tires should become deflated, from puncture or otherwise, the drum may serve as an auxiliary wheel for preventing contact of the rim with the pavement. Thus the tires will be saved and also the rims in many cases.

The device may be used as a tire jack when the car is standing stationary, by inserting a block of wood or other material under the lugs, so as to prevent them entering the ground, and retracting the lever, 60.

In order to enclose the space between the inner flange, 22, and the periphery of the drum, I provide the rings, 69 and 70, fixed to the flange, 22, and the periphery, 23, respectively, and having in their outer and inner edges, respectively, slots, 71. Mounted in the slots, 71, for rotation relative to the rims is a split ring or plate, 72, which is cut away in order to allow the boss, 38, to project between the rings, 69 and 70. The split ring, 72, is held in place and remains stationary by virtue of its engagement with the boss, 38, while the rings, 69 and 70, rotate around it. By making the parts substantially tight fitting the interior of the drum may be packed with grease in order to preserve the parts and minimize friction.

The advantages of my device are obvious. The device may be adjusted as to serve in the place of non-skid chains, which are at present used on tires. In order to do this, the lever, 60, is drawn rearwardly to a position where the correct amount of pressure is had between the lugs and the pavement, or the lugs and the ground, as the case may be. The lugs may be drawn into operative position at the will of the operator and while the car is in motion. As a car begins to skid the skidding may be instantly checked by retracting the lever, 60.

The non-skid chains at present used to prevent skidding have the following disadvantages: The placing upon and removing from the tires is a disagreeable and arduous task which occupies considerable time. They often break when a car becomes badly stuck.

Ordinarily when chains are put on the tires they are left on during the entire day's drive, and many stretches of road will be encountered on which they will not be needed. In fact, they may be only needed for a brief period of driving.

One of the biggest disadvantages of chains is that when driven over asphalt pavement they cut the pavement and wear it down very rapidly.

Some changes may be made in the construction of my invention, and I intend to cover by my claims the use of mechanical equivalents which may be included within their scope.

I claim as my invention:

1. In combination with a vehicle having rear wheels, drums fixed to the wheels for rotation therewith, said drums being slightly less in diameter than the diameter of the wheels, traction lugs mounted in the drums for sliding movement radially thereof, a ring within each drum engaging said lugs, a stationary arch within each drum, having its periphery in sliding contact with the interior of the periphery of the drum, a sliding arch mounted in each stationary arch for downward movement relative thereto, said arches being in sliding contact with the peripheries of the rings, and means carried by the stationary arch for extending the sliding arch downwardly for extending the lugs downwardly as they are rotated to position at the lower portion of the drum.

2. In combination with a vehicle having rear wheels, drums fixed to the wheels for rotation therewith, said drums being slightly less in diameter than the diameter of the wheels, traction lugs mounted in the drums for sliding movement radially thereof, a ring within each drum engaging said lugs, a stationary arch within each drum, having its periphery in sliding contact with the interior of the periphery of the drum, a sliding arch mounted in each stationary arch for downward movement relative thereto, said arches being in sliding contact with the peripheries of the rings, and means carried by the stationary arch for extending the sliding arch downwardly for extending the lugs downwardly as they are rotated to position at the lower portion of the drum, said last means being operable from the driver's seat.

3. In combination with a vehicle having rear wheels, and a rear axle housing, drums fixed to the wheels and adapted to rotate therewith, a stationary member within each drum, a bracket connecting said stationary member with the rear axle housing of the vehicle, a sliding arch mounted in the stationary member for downward movement, extensible lugs within the drums, means carried by the stationary member for forcing the sliding arch downwardly, and means connecting the sliding arch with the lugs to extend the lugs downwardly when the arch is depressed.

4. In combination with a vehicle having rear wheels and a rear axle housing, drums fixed to the wheels and adapted to rotate therewith, a stationary arch within each drum slidably in contact with the interior of the peripheries of the drums, a downwardly extensible arch mounted in each stationary arch for sliding movement, cams interposed between the arches in each drum and having stub shafts journaled in the stationary arch, a lever in the vehicle, lever and link mechanism connecting the lever with the stub shafts for rotating the shafts and extending the extensible arches downwardly, a ring engaged by each extensible arch, extensible lugs within each drum, adapted to be engaged by the rings and extended beyond the peripheries of the drums when the lever is operated.

5. In combination with a vehicle rear wheel and an axle housing therefor, a drum fixed to the wheel for rotation therewith, a stationary arch rigidly connected to the axle housing and having its upper edge in sliding contact with the interior face of the outer peripheral wall of the drum, near the top thereof, extensible lugs mounted in the drum for sliding movement radially thereof, and means carried by the stationary arch for causing said lugs to extend beyond the periphery of the drum.

6. In combination with a vehicle rear wheel and an axle housing therefor, a drum fixed to the wheel for rotation therewith, a stationary arch rigidly connected to the axle housing and having its upper edge in sliding contact with the interior face of the outer peripheral wall of the drum, near the top thereof, extensible lugs mounted in the drum for sliding movement radially thereof, and means carried by the stationary arch for causing said lugs to extend beyond the periphery of the drum, said means being operable from the driving seat of the vehicle.

7. In combination with a vehicle rear wheel and an axle housing therefor, a drum fixed to the wheel for rotation therewith, said drum being slightly less in diameter than the diameter of the wheel, a stationary arch rigidly connected to the axle housing and having its upper edge in sliding contact with the interior face of the outer peripheral wall of the drum, near the top thereof, extensible lugs mounted in the drum for sliding movement radially thereof, and means carried by the stationary arch for causing said lugs to extend beyond the periphery of the drum.

8. In a device of the class described, a rotatable drum having lugs extensible radially thereof, a member held against rotation but movable in one direction in a plane perpendicular to the axis of the drum, and a floating ring having its outer peripheral face divided by a peripheral flange, said ring on one side of the flange being engageable with the lugs, and on the other side with the aforesaid member.

9. In a device of the class described, a rotatable drum having lugs extensible radially thereof, a member held against rotation but movable in one direction in a plane perpendicular to the axis of the drum, and a floating ring engageable on one side of its outer peripheral face with said member, and on the other side of the said face with said lugs.

10. In combination with a vehicle rear wheel, a drum fixed to the wheel for rotation therewith, traction lugs mounted in the drum for sliding movement radially thereof, a floating ring within the drum engaging the lugs, means engaging said ring, adapted to retain it against lateral movement and yet to allow rotation thereof, said last means also serving to transmit radial movement to said ring.

11. In combination with a vehicle rear wheel, a drum fixed to the wheel for rotation therewith, traction lugs mounted in the drum for sliding movement radially thereof, a floating ring within the drum engaging the lugs, means engaging said ring, adapted to retain it against lateral movement and yet to allow rotation thereof, and means for displacing said ring radially.

12. In combination with a vehicle rear wheel, a drum fixed to the wheel for rotation therewith, traction lugs mounted in the drum for sliding movement radially thereof, a floating ring within the drum engaging the lugs, said ring being retained against lateral movement, and means for displacing said ring radially.

13. In combination with a vehicle wheel and an axle therefor, a drum fixed to the wheel and having radially extensible lugs, means for extending said lugs, including a stationary member projecting into the drum, a bracket fixed to the axle housing and supporting said stationary member, a pair of cam shafts journalled in the stationary member, oppositely extending arms fixed to said cam shafts, a bell crank lever having the end of one arm positioned equi-distant from the ends of the arms, and links connecting said bell crank lever to said arms.

14. In combination with a vehicle rear wheel and an axle housing therefor, a ring shaped drum fixed to the wheel and having a peripheral wall and an inner sleeve connected by an outer side wall, spaced concentric rings fixed to the respective edges of the peripheral wall and inner sleeve, means for actuating the lugs, including a stationary member fixed to the axle housing and projecting into the drum between the said rings, and a split ring closing the opening between the said concentric rings, said split ring being slidingly mounted relative to the concentric rings and having its ends engaging the stationary member.

15. In combination with a vehicle rear wheel and an axle housing therefor, a drum fixed to the wheel having an annular groove in the interior face of its outer peripheral wall, a stationary arch rigidly connected to the axle housing and slidingly engaging the drum near the top thereof in said annular groove, extensible lugs mounted in the drum for sliding movement radially thereof, and means carried by the stationary arch for causing said lugs to extend beyond the periphery of the drum.

Signed at Sioux City, in the county of Woodbury and State of Iowa, this 29th day of February, 1924.

ROBERT N. KOENIGSBERGER.